March 28, 1933.   J. H. BECKER   1,902,822
GREASE DISPENSING DEVICE
Filed Sept. 9, 1926
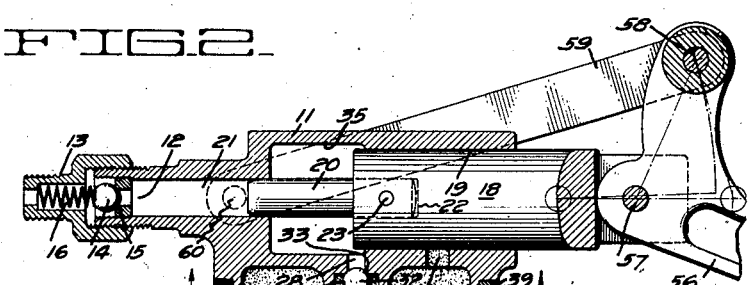
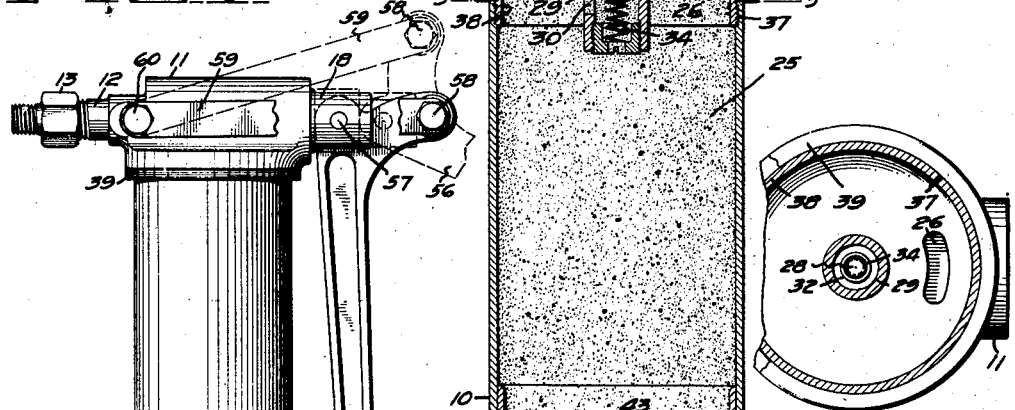
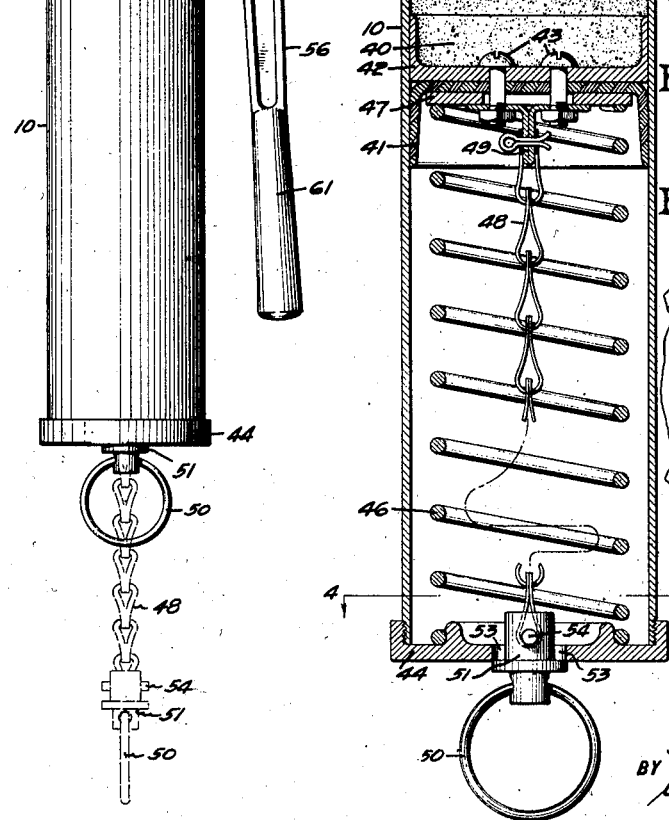
INVENTOR
Julius H. Becker
BY White & Prost
his ATTORNEYS Patented Mar. 28, 1933

1,902,822

UNITED STATES PATENT OFFICE

JULIUS H. BECKER, OF SAN FRANCISCO, CALIFORNIA, ASSIGNOR, BY DIRECT AND MESNE ASSIGNMENTS, TO ALEMITE CORPORATION, A CORPORATION OF DELAWARE

GREASE DISPENSING DEVICE

Application filed September 9, 1926. Serial No. 134,375.

This invention relates generally to devices for discharging or pumping fluids under pressure and has special application as a dispenser of lubricants.

In the lubrication of motor vehicles it has become common practice to use a hand or motor operated pumping device which may be temporarily connected to a bearing for forcing in grease at high pressure. Small portable devices of this kind are known as grease guns and generally comprise a small high pressure plunger operated by means of a hand lever and mounted upon a chamber for containing a charge of grease. All of these devices operate upon the principle of a simple pump, a relatively small amount of grease being discharged at every stroke of the plunger although a pressure of several thousand pounds per square inch may be attained. Many parts of an automobile which must be lubricated, such as steering gear and transmission housings, require a relatively large quantity of grease which may be injected at fairly low pressures. In lubricating devices such as described above, much time is lost in lubricating such bearings since the plunger must be given a large number of strokes to discharge the required amount of grease.

It is an object of this invention to construct a device of the class described which will either discharge a large quantity of fluid at relatively low pressure or a small quantity at a relatively high pressure.

It is a further object of this invention to construct a device for dispensing lubricants which for a given cycle of operation will either discharge a large or small quantity of lubricant, depending upon whether a low or high pressure is necessary to inject the grease into the bearing or other mechanism being lubricated.

It is a further object of this invention to devise a grease gun which may be easily controlled and in which the amount of grease in the chamber may be readily gauged.

It is another object of this invention to devise a grease gun having a novel form of linkage connecting the hand lever and pump whereby substantially no side thrust is transmitted to the pump plunger and in which the effective lever ratio increases toward the end of the stroke.

Further objects of this invention will appear from the following description in which I have set forth the preferred embodiment of my invention. It is to be understood that the invention is to be accorded a range of mechanical equivalents consistent with the state of the prior art.

Figure 1 is a side elevational view of a dispensing device incorporating the principles of this invention.

Fig. 2 is a cross sectional elevational view of the dispensing device shown in Fig. 1.

Fig. 3 is a cross sectional view taken along the line 3—3 of Fig. 2.

Fig. 4 is a cross sectional view taken along the line 4—4 of Fig. 2.

The invention comprises generally a pumping mechanism which is adapted to discharge relatively large quantities of fluid at low pressure or comparatively small quantities at a fairly high pressure. When incorporated in a grease gun or a dispensing device for lubricants, the pumping mechanism preferably takes the form of at least two pump plungers, one of large diameter for discharging grease at low pressure and another of small diameter for discharging at high pressure. Associated with the plunger of large diameter there is a suitable mechanism automatically responsive to the discharge pressure for rendering this plunger ineffective when this discharge pressure increases to a certain given maximum value. After the low pressure plunger is automatically rendered ineffective the high pressure plunger continues to discharge small quantities of grease at high pressure into the bearing.

The particular form of dispensing device shown in the drawing comprises a grease chamber 10 which is preferably cylindrical in shape and is adapted to be secured to a body member 11 for containing the pump mechanism. This body member 11 is provided with a discharge outlet 12 which has been shown as provided with a suitable fitting 13 for attachment to a flexible hose or other discharge pipe. The discharge outlet is also provided with a suitable check valve comprising for example a ball 14 pressed upon a valve 15 by means of a relatively soft spring 16.

The pumping mechanism for discharging fluid through the outlet 12 includes a low pressure plunger 18 which is adapted to snugly fit and reciprocate within a bore 19 provided within the body member 11. A second or high pressure plunger 20, of smaller diameter than the plunger 18, is also arranged within the body member and is adapted to reciprocate within the bore 21, which bore may be formed as a continuation of the discharge outlet 12. The plunger 20 is preferably mounted upon one end of the plunger 18 so that the two plungers reciprocate in unison. For convenience in manufacture it is also desirable that these plungers be in alinement so that the bores 19 and 21 for these plungers may also be constructed with a common axis. As the two bores may not be constructed with exact accuracy it is also desirable to mount the plunger 20 so that it may aline itself to compensate for irregularities in alinement between the bores 19 and 21. This can be accomplished by providing a relatively loose mounting for the plunger 20; for example, this plunger has been shown as having a relatively loose fit within a socket 22 provided in the inner end of the plunger 18, a locking pin 23 extending loosely through both plungers to retain the same together.

In order to permit portions of the grease charge 25 to be drawn into the pumping mechanism, the body member is provided with a suitable port 26 communicating between the interior of the grease chamber 10 and the interior of the bore 19. This port is placed intermediate the inner and outer ends of the bore so that when the plunger 18 is withdrawn a sufficient distance to expose the port, grease from the chamber may flow into the interior of the body member beneath the plunger 18 and around the plunger 20. When the plunger 18 is forced inwardly, port 26 is closed and grease within the body member is entrapped and forced outwardly through the discharge outlet 12. During the latter part of the stroke of plunger 18, plunger 20 enters bore 21 so that during completion of its movement grease is discharged only from bore 21.

When the discharge of fluid meets with resistance, as when lubricating a close fitting bearing, the fluid pressure will immediately build up to a value depending upon the amount of force being exerted against the plunger. When this discharge pressure attains a certain maximum value, means has been provided for automatically rendering the low pressure plunger inactive and for permitting only the high pressure plunger 20 to operate to discharge small quantities of fluid at a relatively high pressure. This means is preferable in the form of a bypass to return the fluid entrapped in the bore 19 to the chamber 10, or other source from which the fluid is pumped, the fluid being only permitted to bypass when the pressure builds up to a certain maximum value. For example, the body member has been shown as provided with a port 28 communicating with the inner portion of the bore 19 and with the interior of a pressure operated valve 29. A port 30 leading from this valve 29 permits entrapped fluid in the bore 19 to escape back into the chamber 10 when the pressure rises above a given maximum value. The particular form of pressure operated valve shown comprises a ball 32 pressed upon a seat 33 by means of a compression spring 34, the strength of this spring determining the pressure at which fluid is permitted to by-pass. In order to facilitate manufacture it is preferable to center the valve 29 with respect to the chamber 10, in which case the bore 19 is counterbored at its inner end as at 35 to provide a passageway around the periphery of the plunger 18 to permit fluid to flow into the port 28. The length of the high pressure plunger 20 is of course such that it does not come into operation within the bore 21 until a substantial portion of grease has been displaced from the bore 19 by the low pressure plunger 18.

The particular form of grease chamber shown incorporates many novel features which are applicable to grease guns in general. The inner end of this chamber is detachably secured to the body member 11 by suitable means such as a threaded connection 37 provided upon the flange 38 extending from the body member. A washer 39 of suitable material such as fiber, may be incorporated with this connection for securing an air-tight fit. Within the chamber there is arranged a follower 40 which is adapted to rest upon the surface of a charge of grease. This follower is shown as constructed of a cup-washer 41 of suitable material such as leather, which is secured to a guide member in the form of a metal cup 42, as by means of screws or bolts 43. While with greases of medium viscosity atmospheric air pressure is sufficient to maintain the follower upon the surface of the grease, it is preferable to provide resilient spring means for positively pressing upon the same. Thus between the follower and the cap 44 provided upon the outer end of the chamber 10, there is a suitable compression spring 46 having its inner end seated upon a washer 47 disposed upon the cup washer 41.

In order to provide for the convenient refilling of the grease chamber means has been provided for withdrawing the follower 40 against the compression spring 46 without removing the cap 44. Thus there is provided a chain 48 or other articulated member having its inner end secured to the follower as by means of a clevis connection 49, and having its other end secured to a suitable gripping device comprising a ring 50 secured to a flanged plug 51. When the grease gun is normally in use the ring 50 may be temporarily attached to the cap 44 by means of the plug which is insertable within an aperture 52 provided in the cap. The aperture 52 is provided with slots 53 for passing the projecting end of a pin 54, this pin being inserted through the plug 51. When the ring 50 and plug 51 are rotated after insertion in the aperture 52, the pin 54 serves as a locking means to retain the ring in this position. When it is desired to refill the chamber, the chamber is unscrewed from the body member 11 and inserted open end downward into a reservoir or receptacle containing the grease. Then by disconnecting the ring 50 from the cap 44 and pulling upon the chain 48 the follower 40 may be retracted against the compression spring 46 to draw a charge of grease into the chamber. One of the links of the chain is then slipped into one of the slots 52 to retain the follower in retracted position until the chamber has been again secured to the body member. The chain 48 is generally made substantially the same length as the length of the grease chamber so that when the follower 40 has reached the limit of its travel and substantially all of the grease has been discharged from the chamber, the chain is practically taut. Therefore at any time during normal operation of the device the amount of grease within the chamber may be gauged by unlocking the ring from the cap 44 and withdrawing the same from the chamber as indicated in the dotted lines of Fig. 1. The length of the chain which may be withdrawn without actually moving the follower 40 will represent approximately the depth of the grease charge remaining in the chamber.

The plungers 18 and 20 are reciprocated by means of a suitable actuator which may be either motor or manually operated. In this particular case the actuator has been shown as being in the form of a manually operated lever 56 fulcrumed as by means of pivot pin 57 to the bifurcated outer end of the plunger 18. This lever is also pivotally connected as by means of pin 58 to adjacent ends of a pair of links 59, the other ends of these links being pivotally connected to the body member 11 as by means of the pivot pins or screws 60. The centers of pivot pins 57 and 60 are substantially alined with the axis of plunger 18. The distance between the pivot pins 57 and 58 is also preferably made relatively short compared to the length of the links 59, and the centered line of the pin is arranged to be substantially at right angles to the center line of the hand hold lever portion 61. With a linkage connection of this kind practically no side thrust will be exerted against the plunger 19 throughout the stroke of the hand lever, with the result that a little wear will occur between the reciprocating parts. Furthermore, the effective leverage ratio of the hand lever upon the plunger increases as the plunger advances into the body member so that much greater forces may be exerted against the plunger with a given force upon the hand lever when the lever is near the end of its stroke and the device is discharging grease by means of the high pressure plunger 20. This effect is made clear by inspection of Fig. 1 in which the full lines show the toggle effect obtained when the plunger is near the limit of its inward movement.

To summarize the operation of the device the operator actuates the pumping mechanism by oscillating the hand lever 56. Upon movement of this lever to the outer limit of its travel the plunger 18 is retracted to expose the port 26, and since the check valve in the discharge outlet 12 prevents entrance of air or grease into the bore 19, the partial vacuum thus created draws grease from the chamber 10 through port 26 into the interior of the body member beneath the plunger 18. Upon returning the hand lever to its initial position the plunger 18 is forced inwardly to displace grease and force the same through the outlet passageway 12. Assuming first that the discharge of grease meets with little resistance, the valve 29 will remain closed with the result that the grease displaced by plunger 18 will be discharged through outlet 12 rather than be bypassed back into the grease chamber. However, as the plunger 18 nears the last part of its movement, plunger 20 enters the bore 21 and displaces the relatively small amount of grease within the same. The entrance of the plunger 20 into the bore 21 however prevents further discharge of grease displaced by the plunger 18 with the result that this remainder is bypassed through valve 29 back into the grease chamber. Assuming however that the discharge of grease meets with considerable resistance, the pressure within the body member will immediately build up upon initial inward movement of the plunger 18 with the result that substantially all of the grease displaced by this plunger will be bypassed through valve 29 back into the chamber. However when high pressure plunger 20 enters the bore 21 a small quantity of grease will be discharged at high pressure during the latter part of the cycle of movement or stroke of the hand lever. In practice the spring 16 of the check valve is made relatively softer than spring 34 of the pressure operated valve 29, the check valve serving only as a means for preventing entrance of air or return of grease into the body member. The spring 34 is usually made such that the valve 29 will open to bypass grease when the pressure attains a value of say 50 pounds per square inch. The plunger 20 being of relatively small diameter is capable of exerting a pressure of even several thousand pounds per square inch. These valves however may obviously be varied to suit various fluids and operating conditions.

It is to be understood that the word "grease" as employed in the specification and claims refers to any lubricant whether viscous or free-flowing.

I claim:

1. In a dispensing device, a grease chamber, means for discharging grease from one end of said chamber, a follower disposed within the chamber and adapted to rest upon a charge of grease, an articulated member having one of its ends attached to said follower and its other end extending through an aperture in the other end of the chamber, said member being engageable with said end of said chamber at a plurality of points spaced along its length thereby to hold said follower in substantially any desired position within said chamber, means for detachably securing the outer end of said member to the chamber, and spring means for resiliently forcing the follower against the grease.

2. In a portable grease dispensing device a tubular grease reservoir, a cap therefor, a passageway extending through said cap, a plunger comprising a pair of concentrically mounted pistons, a bore in said passageway for each of said concentric pistons, an inlet port in the larger of said bores communicating with said reservoir, a hand lever mounted on said head adapted to reciprocate said plunger, and a valved discharge outlet at the outer end of the smaller of said bores.

3. In a grease dispensing device a grease reservoir, a cap for said reservoir comprising a head, means for automatically feeding the grease in said reservoir to said head, a passageway extending through said head comprising a large cylindrical bore, a small cylindrical bore, a plunger operably disposed in said passageway comprising a large piston having a socket in the face thereof and a small piston loosely secured within said socket, a discharge conduit connected to said small bore, said pistons cooperable with their respective cylindrical bores to discharge grease therefrom, said large piston being operable only at the beginning of the discharge stroke to discharge grease, said small piston being operable only during the latter part of the discharge stroke.

4. In a grease dispensing device a grease reservoir, a cap for said reservoir comprising a head, means for automatically feeding the grease in said reservoir to said head, a passageway extending through said head comprising a large cylindrical bore, a small cylindrical bore, and a chamber disposed between said bores; a plunger operably disposed in said passageway comprising a large piston having a socket in the face thereof and a small piston loosely secured within said socket, a discharge conduit connected to said small bore, said pistons cooperable with their respective cylindrical bores to discharge grease therefrom, said large piston being operable only until the pressure in the discharge conduit reaches a predetermined value, and a pressure relief valve opening from said chamber and adjustable to determine the degree of pressure at which the large piston is rendered ineffective to discharge grease.

5. In a grease dispensing device a grease reservoir, a cap therefor comprising a grease pump and means in said reservoir for automatically feeding grease to said pump, said pump comprising a body member having a plurality of concentric bores extending therethrough, a discharge outlet for said pump leading from one of said bores, said bores being of different diameters, and a plunger operable within said bores comprising a pair of pistons of different diameters, a socket in the face of the larger of said pistons, the smaller of said pistons being concentrically secured to said larger piston within said socket, so as to be capable of slight movement relative thereto, said plungers being cooperable with their respective bores to discharge grease from the pump under different pressures at different periods of a single stroke of the pump.

In testimony whereof, I have hereunto set my hand.

JULIUS H. BECKER.